United States Patent [19]

Castonguay et al.

[11] 3,808,576

[45] Apr. 30, 1974

[54] CIRCUIT BOARD WITH RESISTANCE LAYER

[75] Inventors: Richard N. Castonguay; James M. Rice, both of Los Angeles, Calif.

[73] Assignee: The Mica Corporation, Culver City, Calif.

[22] Filed: July 21, 1972

[21] Appl. No.: 273,756

Related U.S. Application Data

[63] Continuation-in-part of Ser. No. 106,832, Jan. 15, 1971, Pat. No. 3,743,583, and a continuation-in-part of Ser. No. 215,395, Jan. 4, 1972, abandoned.

[52] U.S. Cl. .................. 338/309, 161/191, 252/513, 252/518, 338/308, 338/327

[51] Int. Cl. .................. H01c 7/00

[58] Field of Search .......... 338/307, 308, 309, 327; 161/191; 252/513, 518; 117/217, 212

[56] References Cited

UNITED STATES PATENTS

| | | | |
|---|---|---|---|
| 2,662,957 | 12/1953 | Eisler | 338/308 X |
| 2,671,950 | 3/1954 | Sukacev | 338/308 X |
| 3,006,819 | 10/1961 | Wilson | 117/212 X |
| 3,392,054 | 7/1968 | Sadoff | 252/518 X |
| 3,663,241 | 5/1970 | Short | 252/513 X |

*Primary Examiner*—E. A. Goldberg
*Attorney, Agent, or Firm*—Joseph E. Mueth

[57] ABSTRACT

A novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising electroplated nickel alone, or together with up to 30 percent by weight of phosphorus. In one embodiment, the electroplated nickel or nickel-phosphorus also contains a major portion of the oxides, hydroxides and/or peroxides of nickel on that surface of the resistive layer abutting the support. The oxides, hydroxides and/or peroxides on the surface of the resistive layer provide improved bonding of the resistive material to the support, improved high temperature stability, and higher resistivity per unit area.

A novel etching method for the removal of the resistive materials referred to above without the removal of copper and which comprises using ferric sulfate and sulfuric acid in aqueous solution, said solution being about six molar sulfate ion.

10 Claims, 1 Drawing Figure

PATENTED APR 30 1974 3,808,576

CIRCUIT BOARD WITH RESISTANCE LAYER

This application is a continuation in part of application Ser. No. 106,832, filed Jan. 15, 1971 now U.S. Pat. No. 3,743,583 issued July 3, 1973, and Ser. No. 215,395, filed Jan. 4, 1972 now abandoned, the disclosures of which are incorporated herein by reference.

BACKGROUND OF THE INVENTION

Typical of the prior art is U.S. Pat. No. 2,662,957 to Eisler. This patent describes a printed circuit board material consisting of an insulating support, one or more layers of resistance material, and an outer layer of highly conductive material. Printed circuits can be made from this stock. Essentially, the method of converting the stock into the desired product comprises the selective removal of unwanted layers, to leave areas having the required electrical properties, namely, insulating areas (all layers above the support removed), resistance areas (the conductive layer removed), and conductive areas (no layers removed).

Eisler discloses the following resistive layers: An alloy of manganese (over 80 percent) and copper heat treated to over 600° C.; certain copper-manganese-nickel alloys; copper-nickel alloys; nickel-silver (i.e., alloys of copper, nickel and zinc); copper-silicon; copper-nickel-chromium; chromium-nickel; and chromium-nickel-iron. Some alloys of noble metals are also disclosed, for example silver-palladium.

We have found that conventional resistive materials do not always form a good bond to the support. While not bound by any theory, it appears that the support, which is usually an organic resin such as epoxy, polyimide, etc., and the resistive material form a heterogeneous interface which provide a mere mechanical bond or interlock. We have found, quite surprisingly, that a better bond characterized by greater resistance to peel is formed when the resistive material is electroplated nickel which may or may not contain up to 30 percent by weight phosphorus, and the resistive material also includes a major portion, viz., on the order of 50 percent or more by weight of the oxides, hydroxides and peroxides of nickel on that surface abutting the support. These resistive materials seem to have a greater affinity for the resin of the support. In fact, the bond appears to be of a fundamentally different type. The nickel material of this invention appears to produce an electrical and/or chemical adhesion of the resistance layer to the support. Coincidentally, we have found that the novel printed circuit board of this invention also has improved high temperature stability and yields higher levels of resistance per unit area.

We have also found that the present invention provides numerous advantages over resistive layers obtained by the use of electroless baths. The electroless baths are metastable and autocatalytic, and are characterized by poor reproducibility. Further, the unit resistivity is limited by the amount of phosphorus obtainable in deposits from such baths. The electroplating bath is quite reproducible, and provides up to about 30 percent phosphorus in the deposit, and more importantly, on the order from about 8 percent to about 28 percent phosphorus in the deposit on a weight basis. The deposit composition can be regulated by varying the current density. The electroplating bath is far less temperature senitive than the electroless bath. In fact, in the electroplating bath, the deposit composition is independent of the temperature (only the deposition rate being affected), whereas in the electroless bath the deposit composition is a function of temperature.

It is anticipated that this invention, representing a significant advance in the art, will be widely adopted by fabricators of printed circuits.

SUMMARY OF THE INVENTION

Briefly, this invention comprehends a novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising electroplated nickel alone, or together with up to 30 percent by weight of phosphorus. The phosphorus content is critical in a practice and technical sense insofar as this invention is concerned. The preferred phosphorus content has been found to be from about 8 percent to aobut 28 percent by weight.

In one embodiment, the invention includes a novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising a major portion of the oxides, hydroxides and/or peroxides of nickel on that surface of the resistive layer adhering to the support whereby the bonding of said resistive material to said support is improved, and said resistive material has improved high temperature stability and higher resistivity per unit area is attainable.

This invention further includes a novel etching method for the removal of the resistive material referred to above without the removal of copper and which comprises using ferric sulfate and sulfuric acid in aqueous solution, said solution being about six molar sulfate ion.

It is an object of this invention to provide a novel printed circuit board material.

In one aspect, it is a specific object to provide a multilayer printed circuit board material wherein there is improved bonding of the resistive material to the support to provide higher peel strength.

In anoth aspect, it is object of this invention to provide a multilayer printed circuit board stock material wherein the resistive layer has improved high temperature stability.

In yet another aspect, this invention is concerned with providing printed circuit board material which yields higher resistance values per unit area.

In still another aspect, this invention includes novel etching methods.

These and other objects and advantages of this invention will be apparent from the detailed description which follows.

FIG. 1 is a perspective view in partial section of the circuit board wherein the conductive element is 10, the resistance element is 12 and the insulating board is 14.

DESCRIPTION OF PREFERRED EMBODIMENTS

Figure 1:
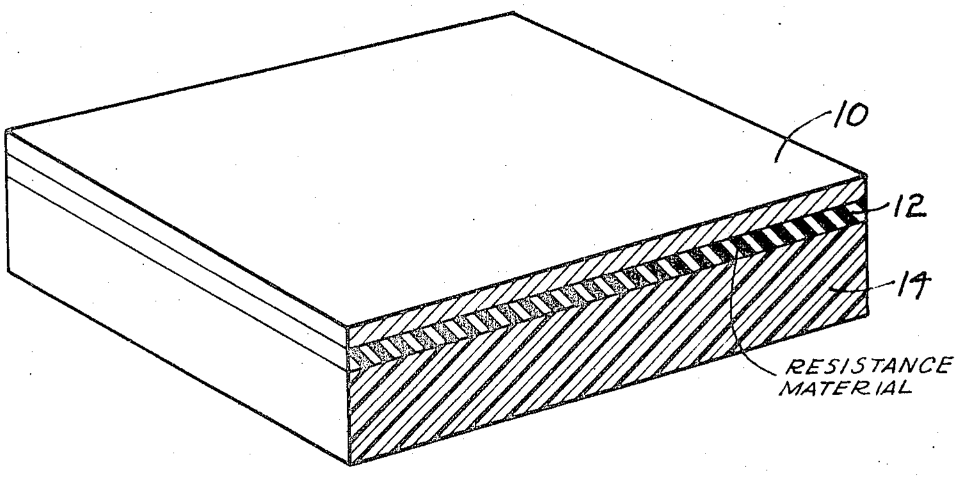

The preferred electroplating bath used for this purpose has the following composition:

| | g/l | M/l |
|---|---|---|
| Nickel sulfate hexahydrate | 37.50 | 0.143 |
| Nickel chloride hexahydrate | 11.25 | 0.048 |
| Nickel carbonate | 7.12 | 0.060 |
| Phosphoric acid (as 100% acid) | 12.25 | 0.125 |
| Phosphorous acid | 7.50 | 0.092 |
| Dowfax 2A1 | 0.11 ml | — |
| Water | Make up to one liter | |
| Concentration of nickel ion in mols per liter | — | 0.25 |

The phosphoric acid and phosphorous acid content may be adjusted, or even reduced to zero to provide from 0 to 30 percent by weight phosphorus in the resistive deposit. The more typical composition, however, is from 8 to 30 percent by weight of phosphorus.

The nickel oxide, hydroxide and/or peroxide is normally formed by treating a bimetallic strip comprising the conductive layer, typically a conductive metal foil, and a resistive material including nickel in an electroformation process. The resistive material is electroformed so that the nickel oxide, hydroxide and/or peroxide is produced predominantly at the exposed surface of the resistive material in the bimetallic strip. The bulk of the nickel or nickel phosphorus within the resistive layer is not chemically altered by the electroforming process. The first step of electroformation can be represented as follows:

$$Ni + 2OH \rightarrow Ni(OH)_2 + 2e^- + 0.66\ v \qquad (1)$$

The base is normally provided by a strong alkali such as potassium hydroxide.

In a second step, the following reaction occurs:

2. $Ni(OH)_2 + 2OH^- \rightarrow NiO_2 + 2H_2O + 2e\ -0.49\ v$ a. $Ni(OH)_2 + OH^- \rightleftarrows NiOOH + H_2O + e^-$ Actually a mixture of $Ni^{+2}$ and $Ni^{+4}$ It is to be understood that the resistive layer treated as just described is prepared by the electroplating of the nickel onto the conductive layer, normally the foil.

The anode typically, although not necessarily, is a 7 inch × 11 inch one ounce per square foot electrolytically deposited nickel foil laminated to a one-sixteenth inch thick epoxy fiberglass board. The anode may also be an inert material such as carbon or graphite, in which case no nickel is present in the anode. The cathode is preferably electrolytic copper foil or other material suitable as the conductive layer.

After the electroforming, the double layer foil is laminated, nickel oxide, hydroxide and/or peroxide side at the interface, with several plies of fiberglass fabric preimpregnated with an appropriate formulation of curable organic resins. The lamination process is well known to those skilled in the art. Following lamination, and at the time of use in printed circuit manufacture, the copper surface is coated with photoresist. This layer of photoresist is then exposed through a photographic negative containing the negative image of the combined resistor and conductor patterns. The exposed resist is developed, and the unexposed portion washed away. The panel with the developed image is then etched in an etchant such as an alkaline etchant or ferric chloride acidified with hydrochloric acid until the bare copper is removed. The panel is then rinsed in water and immersed in an acid etchant as more fully hereinafter described until the bare nickel-phosphorus is removed. The remaining exposed photoresist is stripped off and the panel is coated with a new layer of photoresist. This layer is exposed through a photographic negative containing the negative image of the conductor pattern. The exposed resist is developed, and the unexposed portion washed away. The panel with the developed image is then etched in a chromic acid etchant as more fully described below until the bare copper is removed. The panel is then rinsed in water and dried. At this point, the conductive and resistive patterns are individually defined, and in appropriate electrical contact with each other.

The general procedure as detailed here and further in the example which follows contemplates the use of photographic negatives and negative working resists. It should be noted specifically that other processing materials, well known to those skilled in the art of printed circuit manufacture, are also suitable. For instance, photographic positives can be used in combination with positive working resists (e.g., PR-102 by General Aniline & Film Corporation). Silk screening techniques can also be used in conjunction with any resist that is not attacked by the etchants.

The following example is presented solely to illustrate the invention and should not be regarded as limiting in any way.

EXAMPLE

The shiny or drum side of the copper is coated with a strippable vinyl coating. The copper is cut to the size. The plating bath, made up as previously indicated, is heated to 170° F. with constant agitation. The nickel anode is mounted in its vertical holder brace and attached to the power supply. The copper is immersed in 20 percent hydrochloric acid for 3 minutes, and then rinsed twice in distilled water. The copper is fastened to the electrode backup plate. The copper cathode assembly is mounted in its vertical holder brace in the bath, and the agitation is stopped. The power supply is attached to the protruding copper strip and the cathode assembly is allowed two minutes to equilibrate with the temperature of the bath. The power supply, having been preadjusted for the desired current and voltage is turned on for the appropriate plating period and then turned off, in this case a current density of 1.08 amps per square decimeter for 60 seconds gives a sheet resistivity of 50 ohms per square. The bath is allowed to stand one minute before removing the cathode assembly. The cathode assembly is taken apart and the now plated copper foil separated. The copper foil is rinsed first in tap water, then in distilled water at 190° F. The plated foil is dried in a stream of warm air. The foil is then placed in an electroforming bath containing a 30 percent solution of KOH. The plated foil, plated side down is stacked atop several layers of fiberglass fabric, preimpregnated with an appropriate formulation of epoxy resins. Using techniques well known to those skilled in the art, the assemblage is cured in a steam heated hydraulic press under heat and pressure to produce an epoxy-fiberglass laminate, clad on one or both sides with the plated foil made as described above. The copper surface of the panel is coated with photoresist (Kodak KPR). The photoresist is exposed through a photographic negative of the combined conductor and resistor patterns. The resist is developed and the unexposed portions washed away. The panel is immersed in an alkaline etchant such as MacDermid's MU to remove the copper in the areas not covered by photoresist. The panel is immersed in an acid etchant to remove the exposed resistive material. This etchant has the following composition:

$Fe_2(SO_4)_3 \cdot XH_2O$ [ (containing 75 percent by weight anhydrous $Fe_2(SO_4)_3$] — 535 gms Concentrated $H_2SO_4$ — 200 ml $H_2O$ — to 1 liter The etchant is essentially passive to copper.

The panel is rinsed in water, the remaining photoresist stripped off, and a new layer of photoresist applied. The photoresist is exposed through a photographic negative of the conductor pattern. The resist is developed and the unexposed portions washed away. The panel is immersed in an etchant to remove the copper in the areas not covered by photoresist. This etchant has the following composition:

Chromic Acid (As $CrO_3$) — 300 gms

Concentrated $H_2SO_4$ — 35 ml $H_2O$ — to 1 liter

This etchant is essentially passive to the resistive material.

The panel is rinsed in water and the remaining photoresist stripped off. The resistor-conductor pattern is now complete.

The time required to convert the nickel to the oxide, hydroxide and/or peroxide at constant potential is independent of the area of the electrodes and the current level. It has also been found that a greater depth of conversion results by the cycling of the current to the plated foil, that is, by repetitious charging and discharging.

The highly conductive layer of the stock preferably consists of a pre-formed metal foil such as copper foil, tinned copper foil, aluminum foil, zinc foil or silver foil, and any convenient foil thickness may be used, for instance 0.002 inch.

The insulating support may be any of the materials known to those skilled in the art. For example, the support may be a polyimide such as those based on organic diamines and dicarboxylic or tetracarboxylic acids. The epoxy resins based on the polyglycidyl ethers of organic polyphenols are also preferred. These resinous supports may contain any of the familiar reinforcing materials such as fiberglass fabric. The support can also be phenolic resin-impregnated paper, melamine resin-impregnated paper, or polyester resin containing chopped glass reinforcement.

Having fully described the invention, it is intended that it be limited only by the lawful scope of the appended claims.

We claim:

1. A novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising electroplated nickel-phosphorus containing up to about 30 percent by weight of phosphorus.

2. A novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising nickel-phosphorus containing from 8 to about 30 percent by weight of phosphorus.

3. The novel printed circuit board material of claim 1 wherein the conductive layer comprises copper foil.

4. The novel printed circuit board material of claim 1 wherein the support comprises a reinforced organic resin.

5. The novel printed circuit board material of claim 3 wherein the support comprises a fiber glass fabric reinforced epoxy resin.

6. The novel printed circuit board material of claim 1 wherein the support comprises a fiber glass fabric reinforced epoxy resin.

7. A novel printed circuit board material in the form of a multilayer stock comprising an insulating support, at least one layer of electrical resistance material adhering to said support, and a layer of a highly conductive material adhering to the resistance material and in intimate contact therewith, said layer of electrical resistance material comprising nickel-phosphorus containing from 8 to about 30 percent by weight of phosphorus, wherein the nickel in said layer of electrical resistance material includes a major portion of the oxides, hydroxides and/or peroxides of nickel whereby the bonding of said resistive layer to said support is improved, and said resistive material has improved high temperature stability and higher resistivity per unit area is attainable.

8. The novel printed circuit board material of claim 7 wherein the conductive layer comprises copper foil.

9. The novel printed circuit board material of claim 7 wherein the support comprises a reinforced organic resin.

10. The novel printed circuit board material of claim 7 wherein the support comprises a fiber glass fabric reinforced epoxy resin.

* * * * *